United States Patent [19]

Katagiri et al.

[11] Patent Number: 5,782,355

[45] Date of Patent: Jul. 21, 1998

[54] CASSETTE CASE

[75] Inventors: Shingo Katagiri; Teruo Ashikawa, both of Kanagawa, Japan

[73] Assignee: Fuji Photo Film Co., Ltd., Kanagawa, Japan

[21] Appl. No.: 967,822

[22] Filed: Nov. 12, 1997

Related U.S. Application Data

[63] Continuation of Ser. No. 521,648, Aug. 31, 1995, abandoned.

[30] Foreign Application Priority Data

Sep. 30, 1994 [JP] Japan ................... 6-237781

[51] Int. Cl.⁶ ........................... B65D 85/30
[52] U.S. Cl. ................ 206/387.1; 242/338; 206/493
[58] Field of Search ............... 206/387.1, 387.12, 206/387.13, 387.11, 493; 242/338, 345, 338.4

[56] References Cited

U.S. PATENT DOCUMENTS

| | | | |
|---|---|---|---|
| 3,612,432 | 10/1971 | Johnson | 242/338.4 |
| 3,978,985 | 9/1976 | Zinnbauer | 206/493 |
| 3,988,779 | 10/1976 | Leis et al. | 242/338.3 |
| 3,996,618 | 12/1976 | Suzuki | 242/338.4 |
| 4,060,838 | 11/1977 | Meermans | 242/338.3 |
| 4,314,294 | 2/1982 | Riccio et al. | 242/338.3 |
| 5,050,022 | 9/1991 | Aizawa | 242/338.3 |
| 5,209,351 | 5/1993 | Schoettle et al. | 206/387.1 |
| 5,323,904 | 6/1994 | Katagiri et al. | 206/387.1 |
| 5,429,237 | 7/1995 | Morita | 206/387.13 |
| 5,445,268 | 8/1995 | Suzuki | 206/493 |
| 5,503,272 | 4/1996 | Morita | 206/493 |

FOREIGN PATENT DOCUMENTS 2262512  6/1993  United Kingdom ........... 206/387.1

*Primary Examiner*—Paul T. Sewell
*Assistant Examiner*—Nhan T. Lam
*Attorney, Agent, or Firm*—Sughrue, Mion, Zinn, Macpeak & Seas, PLLC

[57] ABSTRACT

A cassette case which allows positioning and fixing of a hub without biting of a hub pawl, and enhances the convenience with which the case is used. A plate-like portion comes at its edge into contact with a corner of a peak of a hub pawl without the plate-like portions of the projection coming at their edges into engagement with the hub pawl when a cover section of a storage case has been closed relative to a casing section. The sum of pushing forces exerted on the hub pawl by the plate-like portion causes the hub to rotate to thereby introduce the hub pawl into a space formed between the plate-like portions. In order to carry out the above-mentioned operation, the plate-like portion is designed to have an edge extending in a direction from a front to a rear, and vice versa, of a magnetic tape cassette to be encased in the storage case, and the plate-like portion is designed to have an edge making a predetermined angle with the above-mentioned direction.

12 Claims, 9 Drawing Sheets

FIG. 15
FIG. 16
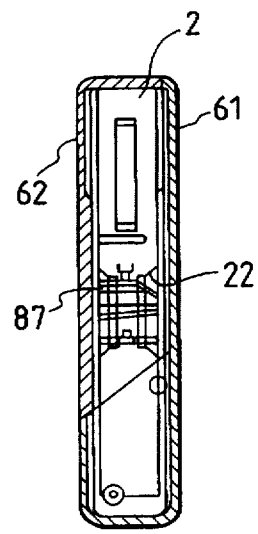
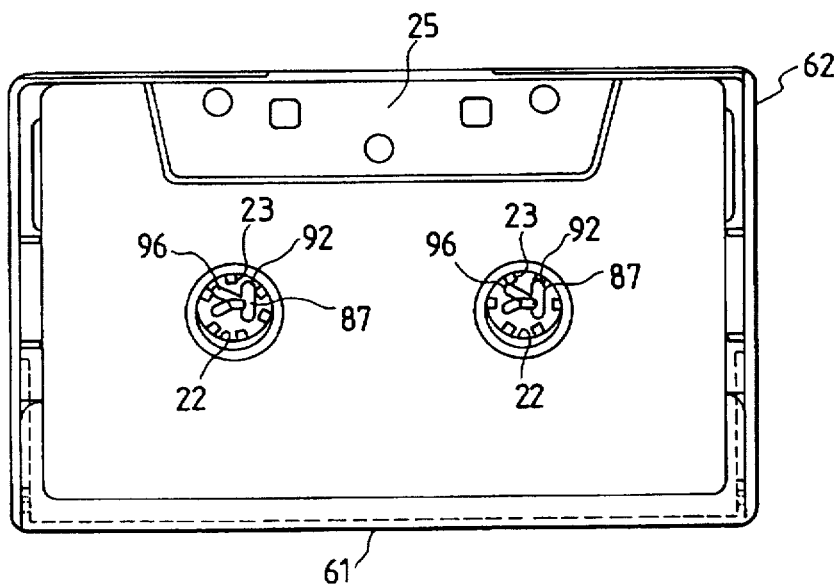
FIG. 17
FIG. 18
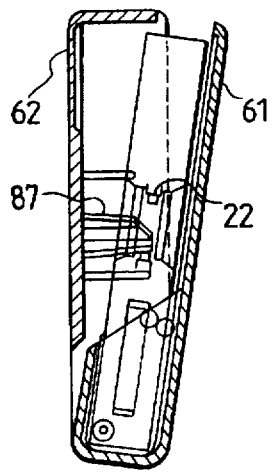
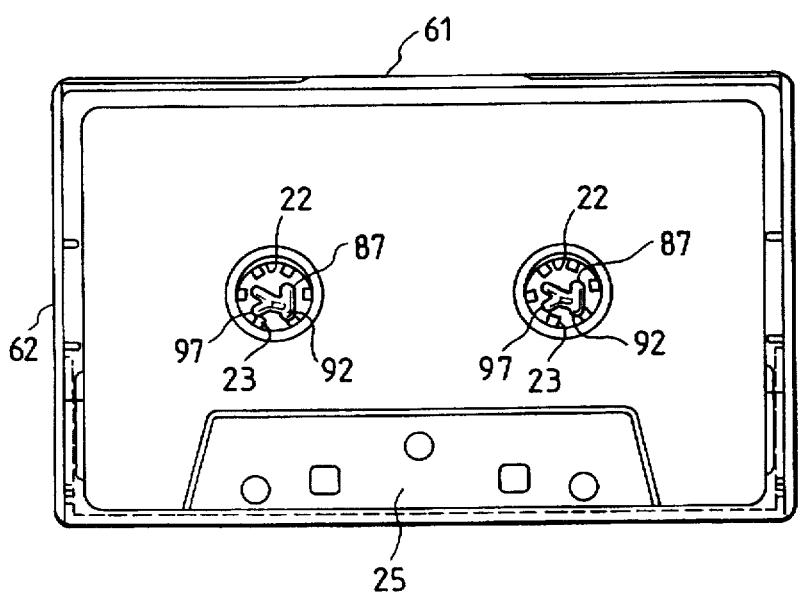

CASSETTE CASE

This is Continuation of application Ser. No. 08/521,648 filed Aug. 31, 1995 abandoned.

BACKGROUND OF THE INVENTION

The present invention relates to a case for a tape cassette, and more particularly to an improvement of such a case used for storing therein a magnetic tape cassette such as a compact audio tape cassette.

In general, a magnetic tape cassette to be used with audio equipment (hereinafter referred to simply as an audio tape cassette) has a front opening into which a magnetic head is inserted when the tape cassette is loaded in a recording apparatus, and a magnetic tape which extends across the front opening. Such a tape cassette is in general stored in a case for encasing therein a magnetic tape cassette (hereinafter, referred to simply as a storage case) made of plastic material in order to prevent dust from entering the cassette through the front opening, and also to protect the magnetic tape exposed at the front opening and other wholes of the tape cassette.

FIG. 19 illustrates a conventional storage case. The storage case 1 comprises a cover section 11 and a casing section 12 connected to the cover section 11 so that the casing section 12 is able to open and close relative to the cover section 11. The cover section 11 includes a cover wall 13 facing one side of a tape cassette 2, and a pocket section 14 formed at one end of the cover wall 13 for receiving a front opening 21 of the tape cassette 2. As illustrated, an index card 3 and the tape cassette 2 are able to be inserted into and drawn out of the pocket section 14 along the cover wall 13.

The casing section 12 includes a casing wall 15 for covering the other side of the tape cassette 2 loaded onto the cover section 11, a pair of pivots 16 for rotatably connecting the casing wall 15 with the cover section 11, and a pair of rotation preventing projections 17 formed on the casing wall 15.

Each of the pivots 16 has, for instance, a recess formed at opposite side walls of the pocket section 14 of the cover section 11, and a shaft-like projection formed on an internal surface of the casing section 12 at a position corresponding to the position of the recess. The pivots rotatably connect the cover section 11 and the casing section 12 with each other so that a space formed by the cover section 11 and the casing section 12 for receiving a tape cassette thereinto can to be opened and closed. The projections 17 engage a central opening of hubs 22 (hereinafter referred to as a hub opening) of the tape cassette 2 loaded onto the cover section 11 to thereby prevent loosening of the tape while a tape is being stored in the tape cassette and the casing wall 15 has been rotated by means of the pivots 16 to be closed relative to the cover section 11.

More specifically, as illustrated in FIG. 20, the projections 17 include, for instance, an engagement section 18 having a width chosen so that opposite ends of the engagement section 18 extend between adjacent hub pawls 23a and 23b and also between adjacent hub pawls 23d and 23e, all of which are formed at an internal surface of the central opening of the hub 22, and a projection section 19 extending perpendicularly to the engagement section 18 and having opposite ends facing hub pawls 23c and 23f, which face one another.

Both of the engagement section 18 and projection section 19 have an upper end outwardly cut-out so that the engagement section 18 and the projection section 19 are readily fit into the hub opening when the casing section 12 is closed relative to the cover section 11.

In FIG. 19, an arrow (a) indicates a direction in which the cover section 11 is open and closed, and an arrow (b) indicated a direction in which the index card 3 and the tape cassette 2 are inserted into the cover section 11.

However, as illustrated in FIG. 20, the width $W_1$ of the engagement section 18 of the projection 17 is much smaller than the width $W_0$ between adjacent hub pawls 23 of the hub 22. Such a difference in width allows the hub 22 to rotate in a range of $W_2 = W_0 - W_1$, even though the projection 17 is engaged with the hub 22, resulting in the magnetic tape exposed at the front opening 21 being loosened, while opposite ends of the projection section 19 slightly rotate and thus no longer face the hub pawls 23 to thereby make it impossible to prevent unwanted slight rotation of the hub 22, and causing undesired shocks exerted on the hub and the tape produced due to slight rotation while the case is being transported.

The hub opening of the tape cassette 2 is positioned closer to a rear end of the tape cassette. Accordingly, as illustrated in FIG. 21, though there exists a common area 4 in which the hub opening overlaps when two tape cassettes 2 are overlaid one on another with front and rear ends being aligned (one of the tape cassettes is shown in phantom), the center of the hub opening is located closer to either the front end or rear end of the tape cassette in accordance with the direction in which the tape cassette is loaded, i.e., from the front end or rear end thereof.

If the tape cassette is loaded from the rear end thereof, which cassette has projections 17 which are designed supposing that the tape cassette 2 is loaded into the pocket section 14 from the front end, the storage case 1 cannot be closed, resulting in an inconvenience that the tape cassette 2 has to be turned over and loaded again into the pocket section.

To overcome such a problem, there has been suggested a case into which a tape cassette 2 can be loaded from either the front end or the rear end thereof, as disclosed in Japanese Utility Model Unexamined Publication No. 4-78185, Japanese Patent Unexamined Publication No. 4-311484, and U.S. Pat. No. 5,429,237. However, the projections formed in such storage cases comprise with relatively thin plates so that the projections can be located in the above-mentioned common area 4, as illustrated in FIG. 21, causing a problem in that the strength for fixing the hub in place is low.

To overcome such a problem, the inventors have proposed a projection 27 having a structure as illustrated in FIGS. 22 to 25 which is described in European Patent Publication No. 0 661 703-A.

FIG. 22 is a top plan view illustrating the casing section 12 on which the projections 27 are formed. The casing section 12 is designed taking into consideration the fact that the tape cassette 2 may be loaded into the pocket section in the reverse direction, that is, first by the rear end thereof, and also is designed to be more slim by forming a recessed portion 28 on the casing wall 15 at a location at which a thick portion 25 (see FIG. 19) of the cassette tape 2 loaded in a reverse direction is located. The recessed portion 28 receives therein the increased thickness of the portion 25 of the cassette tape 2.

The projection 27 for preventing rotation of the hub includes, as illustrated in FIGS. 23 and 24, two plate-like portions 29 and 30 perpendicularly extending from the casing wall 15, and a connection 33 for connecting the plate-like portions 29 and 39 to each other. The projection 27 is shaped substantially in the form of the letter H as viewed from the top. Both of the plate-like portions 29 and 30 extend on the casing wall 15 in a direction from a front end to a rear end, and vice versa, of the tape cassette 2, and extend in parallel with each other. The plate-like portions 29 and 30 cooperate with each other to provide a space 35 therebetween into which one of the hub pawls 23 formed at an internal surface of the central opening of the hub 22 is to be engaged. The plate-like portions 29 and 30 are different in height, that is, the plate-like portion 29 is designed to be taller, while the plate-like portion 30 is designed to be lower.

As illustrated in FIG. 24, the connection 33 has a maximum height h which is the same as the height of the lower plate-like portion 30. The connection 33, as illustrated in FIG. 23, connects the taller plate-like portion 29 to the lower plate-like portion 30 at their intermediate portions in a widthwise direction thereof to thereby provide spaces 35 at opposite sides of the connection 33 for engaging the hub pawl thereto. Into one of the spaces 35 is fit the hub pawl 23 when the tape cassette 2 is loaded, for instance, in a positive direction, while the other of the spaces 35 receives the hub pawl 23 when the tape cassette 2 is loaded in a reverse direction.

As illustrated in FIG. 24, internal surfaces of the taller plate-like portion 29 and the lower plate-like portion 30, which cooperate with each other to form the spaces 35, are inclined surfaces providing a narrower width of the space 35 at a height closer to a bottom end thereof. The width $W_3$ of the spaces 35 at their upper ends is an appropriate width greater than the outer diameter of a locus obtained when the hub pawl 23 is rotated, so that the hub pawl 23 to be received into the space 35 does not interfere with the upper end of the lower plate-like portion 30 when the cover section of the storage case is closed and then smoothly introduced into the space 35. The width of the spaces 35 at their bottom ends is determined to be an appropriate value so that the hub pawl 23 received into the space 35 does not have a large play with the cover section of the storage case being closed.

FIG. 25 illustrates the hub pawl 23 of the hub 22 properly engaging the space 35 of the projection 27.

The structure in which the above-mentioned projection 27 in which the hub pawl 23 of the hub 22 is to be received in the space 35 formed between the two plate-like portions 29 and 30 makes it possible to precisely position and fix the hub 22 to thereby avoid an unsteady condition of the hub 22 while being transported.

In addition, since the plate-like portions 29 and 30 are disposed at a common area in which an opening of the hub 22 is commonly located when the cassette tape is loaded both in positive and reverse directions, the tape cassette may be loaded in either a positive direction or a reverse direction. In addition, the structure connecting the plate-like portions 29 and 30 to each other at their bottom ends through the spaces 35 makes it possible to obtain a required strength of the projection 27, thereby preventing an accident due to deterioration of the strength.

However, it has been found the above-mentioned projection 27 has a problem as follows. Namely, as is shown in FIG. 26, it may occur that top surfaces of the adjacent disposed hub pawls 23a and 23b come in contact with side edges of the plate-like portions 29 and 30, respectively, when the cover section and the casing section of the storage case are closed relative to each other. If the projection 27 further enters the hub 22 without releasing engagement of the hub pawls 23a and 23b with the side edges of the plate-like portions 29 and 30, respectively, the hub pawls 23a and 23b may bite the plate-like portions 29 and 30. This causes a subsequent opening operation of the cover section to be difficult, and also may cause the hub pawls 23a, 23b and the plate-like portions 29, 30 to be damaged when they bite each other. The above-mentioned problem may commonly occur in both a storage case in which a tape cassette can be loaded in either a positive direction or a reverse direction, and a storage case in which a tape cassette can be loaded only in a single direction, if the case in question is structured to have projections having at least two plate-like portions cooperating with each other to form a space therebetween into which a hub pawl is to be received in order to prevent hub rotation.

SUMMARY OF THE INVENTION

Accordingly, it is an object of the present invention to provide a case for encasing a cassette therein capable of precisely positioning and fixing the cassette hubs by means of a projection, readily obtaining a strength required for the projection, preventing the occurrence of biting of the projection with the hub pawl, inserting a tape cassette thereinto in either a positive direction or a reverse direction, and enhancing the convenience with which the case is to be used.

The above-mentioned object is accomplished by a case for encasing a cassette therein, the case comprising a cover section including a cover wall facing one side of a magnetic tape cassette and a pocket section formed at one end of the cover wall for receiving one end of the magnetic tape cassette, and a casing section having a projection formed on a casing wall facing the cover wall, the projection entering a central opening in a hub of the magnetic tape cassette to thereby engage to a hub pawl for preventing the hub from rotating, the casing section being pivotably secured to the cover section so that the casing section is capable of opening and closing relative to the casing section, the projection comprising two plate-like portions cooperating to provide a space into which the hub pawl is received when the projection enters the hub, the case being characterized in that at least one of the plate-like portions is formed with an inclined portion which directs a force in a direction to allow the hub to rotate in a clockwise or counterclockwise direction, this force being exerted on the hub pawl by the one of the plate-like portions when the one of the plate-like portions comes into contact with the hub pawl on closing the cover section to the casing section.

In a preferred embodiment of the present invention, one of the plate-like portions has an edge extending a direction in which the magnetic cassette tape is received in the pocket section, and the other of the plate-like portions has an edge extending at an angle to the direction and further having an inclination relative to a surface of the casing wall.

The above-mentioned object also can be accomplished by a case wherein the two plate-like portions have an end located most remote from the surface of the casing wall in a vertical direction, this end being located in an area in which an opening of the hub is commonly located when the magnetic tape cassette is loaded both in positive and negative directions onto the casing section, one of the two plate-like portions which comes into contact with the hub pawl when the magnetic tape cassette is loaded both in a positive direction and in a reverse direction having an edge formed with an inclined portion which directs a force in a direction to allow the hub to rotate in a clockwise or counterclockwise direction, the force being exerted on the hub pawl by the one of the plate-like portions when the one of the plate-like portions comes into contact with the hub pawl on closing the cover section to the casing section. Accordingly, when the hub pawl comes into contact with each of the edges of the two plate-like portions on closing the cover section relative to the casing section with the magnetic tape cassette loaded in a positive or reverse direction, each of the plate-like portions exerts a pushing force on the hub pawl to thereby rotate the hub to allow the hub pawl to be released from engagement with the edge of the plate-like portion.

BRIEF DESCRIPTION OF THE DRAWINGS

FIG. 15 is a side view illustrating a condition in which the cover section has been closed relative to the casing section in the storage case in accordance with the second embodiment when the tape cassette is loaded in a reverse direction.

FIG. 16 is a plan view illustrating a condition in which the cover section has been closed relative to the casing section in the storage case in accordance with the second embodiment when the tape cassette is loaded in a reverse direction.

FIG. 17 is a side view illustrating a condition in which the cover section has been closed relative to the casing section in the storage case in accordance with the second embodiment when the tape cassette is loaded in a positive direction.

FIG. 18 is a plan view illustrating a condition in which the cover section has been closed relative to the casing section in the storage case in accordance with the second embodiment when the tape cassette is loaded in a positive direction.

DESCRIPTION OF THE PREFERRED EMBODIMENTS

Hereinbelow will be explained preferred embodiments in accordance with the present invention with reference to the attached drawings.

Figure 1:
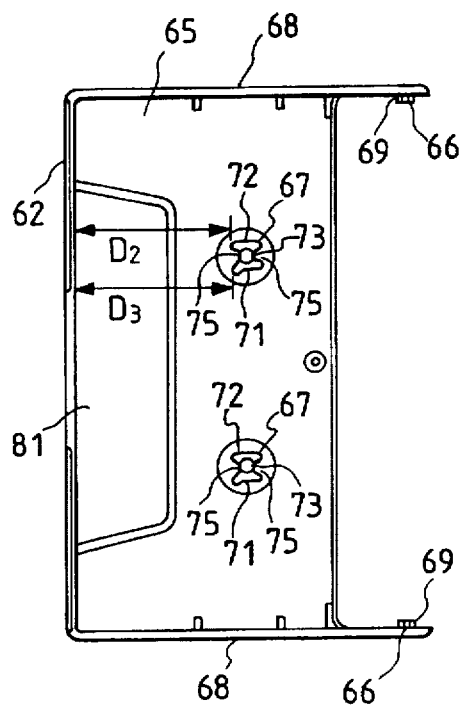
FIG. 1 is a top plan view of the casing section of a storage case in accordance with a first embodiment of the invention.
Figure 2:
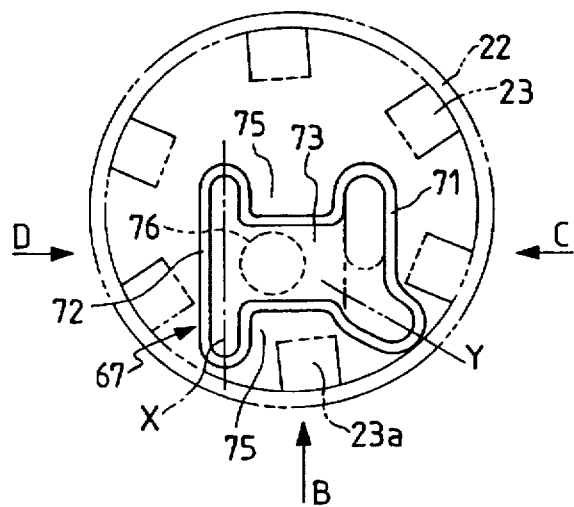
FIG. 2 is a plan view illustrating engagement of the projection with the hub of the tape cassette in the first embodiment.
Figure 3A:
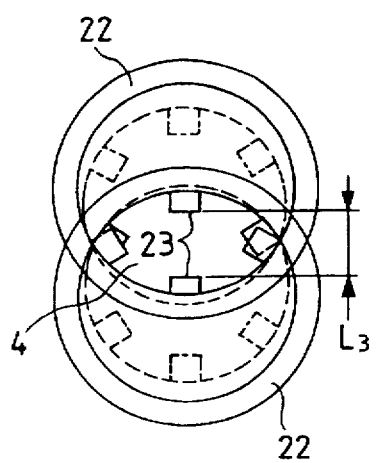
FIGS. 3(a), 3(b) and 3(c) show differences in position of the hub in dependence on whether a tape cassette is loaded in a positive direction or a reverse direction.
Figure 3B:
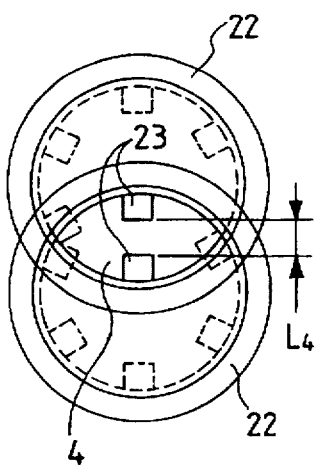
Figure 3C:
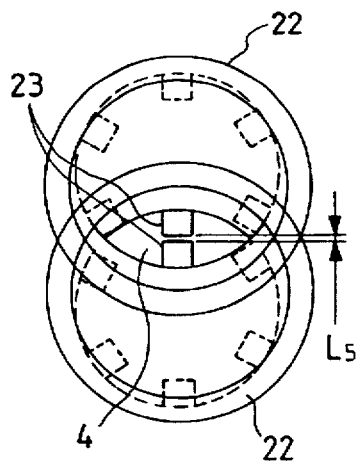
Figure 4:
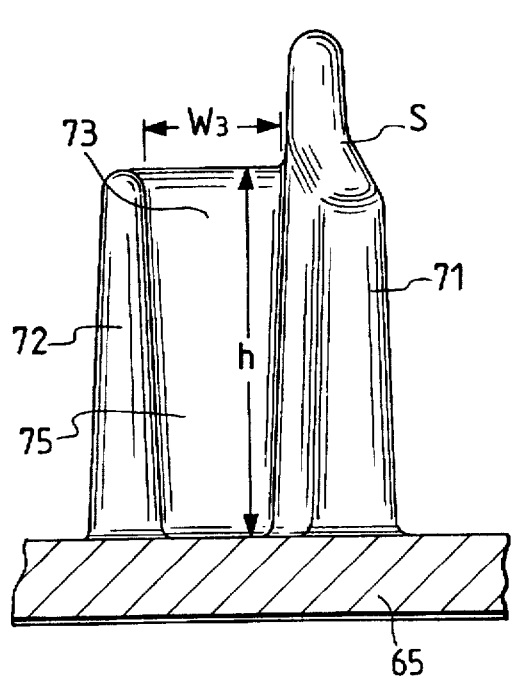
FIG. 4 is a view of the projection as viewed in the direction of an arrow B shown in FIG. 2.
Figure 5:
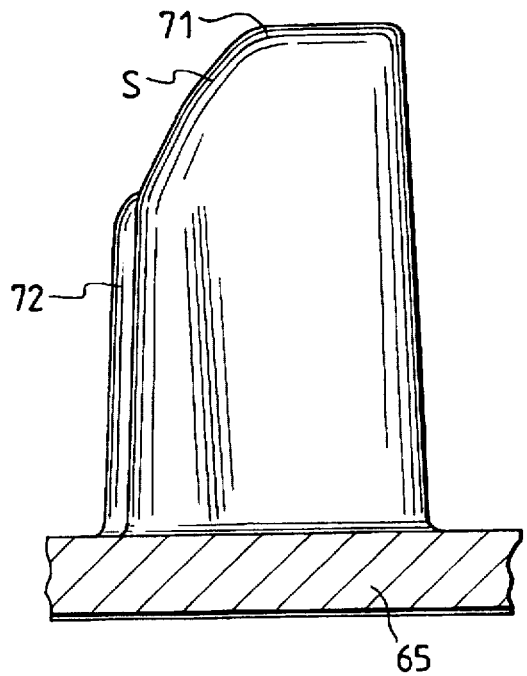
FIG. 5 is a view of the projection as viewed in the direction of an arrow C shown in FIG. 2.
Figure 6:
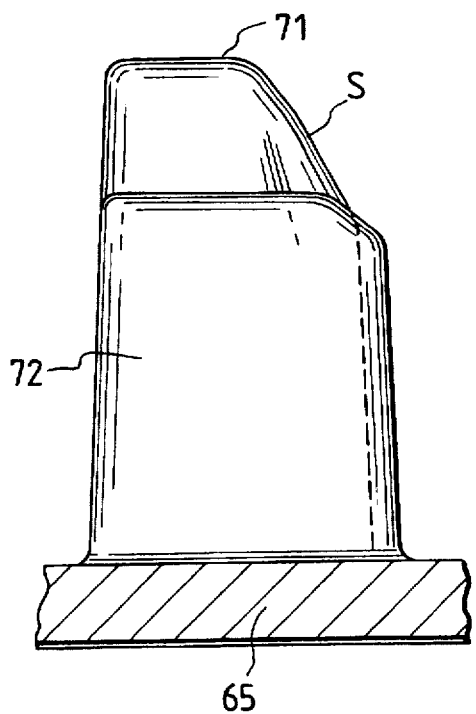
FIG. 6 is a view of the projection as viewed in the direction of an arrow D shown in FIG. 2.
Figure 7:
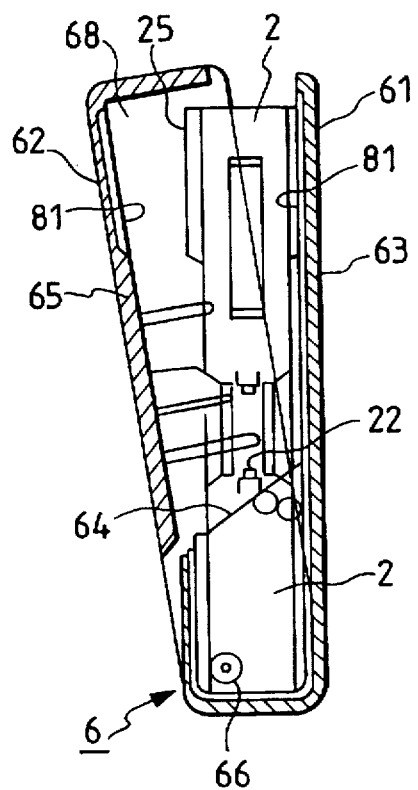
FIG. 7 illustrates a condition in which the cover section is about to start closing relative to the casing section in the storage case in accordance with the first embodiment.
Figure 8:
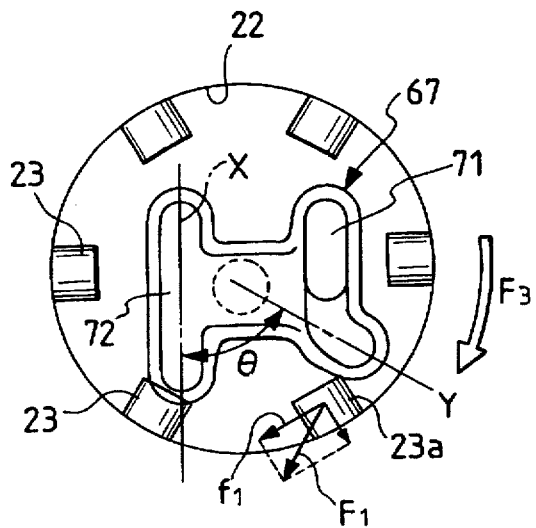
FIG. 8 shows a function of the projection in accordance with the first embodiment.
Figure 9:
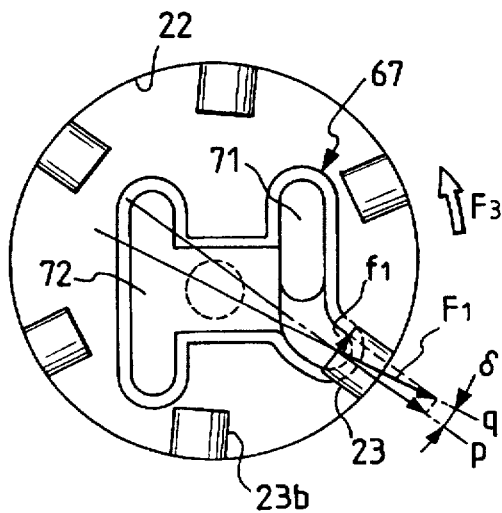
FIG. 9 shows a function of the projection in accordance with the first embodiment.
Figure 10:
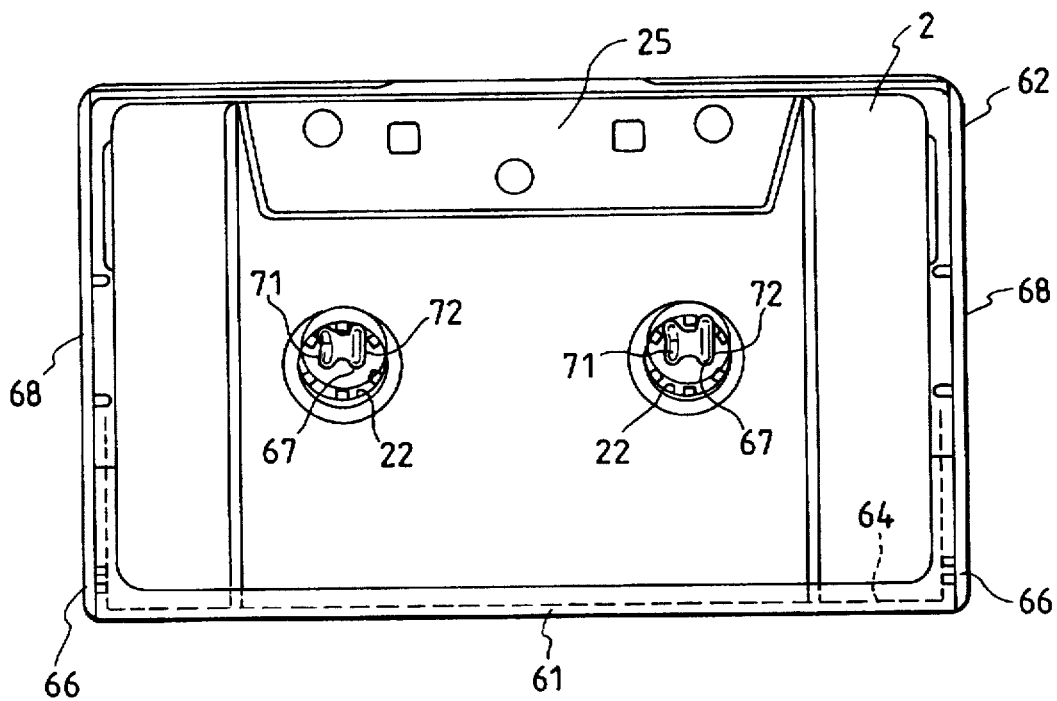
FIG. 10 illustrates a condition in which the cover section has been closed relative to the casing section in the storage case.

FIGS. 1 to 10 illustrate a first embodiment of the storage case in accordance with the present invention, of which FIG. 1 is a top plan view of a casing section 62 of a storage case 6 in accordance with the first embodiment, FIG. 2 is a plan view illustrating engagement of a projection formed on the casing section 62 with a central opening (hub opening) of a hub 22 of a tape cassette, FIG. 3 shows a difference in position of the hub opening in dependence on whether a tape cassette is loaded in a positive direction or a reverse direction, FIG. 4 is a side view of the projection 67 as viewed in the direction of an arrow B shown in FIG. 2, FIG. 5 is a side view of the projection 67 as viewed in the direction of an arrow C shown in FIG. 2, FIG. 6 is a side view of the projection 67 as viewed in the direction of an arrow D shown in FIG. 2, FIG. 7 illustrates a condition in which a cover section 61 is about to start closing relative to a casing section 62 in the storage case 6, FIG. 8 illustrates the function of the projection 67 in accordance with the first embodiment, and FIG. 10 illustrates a condition in which the cover section 61 has been closed relative to the casing section 62 in the storage case 6.

As illustrated in FIG. 7, the storage case 6 in accordance with the first embodiment comprises the cover section 61 and the casing section 62 connected to the cover section 61 so that it is able to pivotally open and close relative to the casing section 62. The cover section 61 includes a cover wall 63 facing one side of a tape cassette 2, and a pocket section 64 formed at one end of the cover wall 63 for receiving a front end (that is, the front opening 21) or a rear end of the tape cassette 2 therein.

As illustrated in FIG. 1, the casing section 62 comprises a casing wall 65 for covering the other side of the tape cassette 2 loaded onto the cover section 61, a pair of pivots 66 for rotatably connecting the casing wall 65 with the cover section 61, and a pair of rotation preventing projections 67 formed on the casing wall 65. Each of the pivots 66 comprises, for instance, a pair of shaft-like projections 69 formed on opposite side walls 68 of the casing section 62, and a pair of recesses formed at opposite side walls of the pocket section 64 of the cover section 61. By fitting the shaft-like projections 69 into the recesses, the cover section 61 and the casing section 62 are rotatably connected with each other.

The projections 67 engage a hub opening of the tape cassette 2 loaded onto the cover section 61 to thereby prevent loosening of a tape while a tape is being stored in the tape cassette when the casing wall 65 has been rotated by means of the pivots 66 to be closed relative to the cover section 61.

Figure 21:
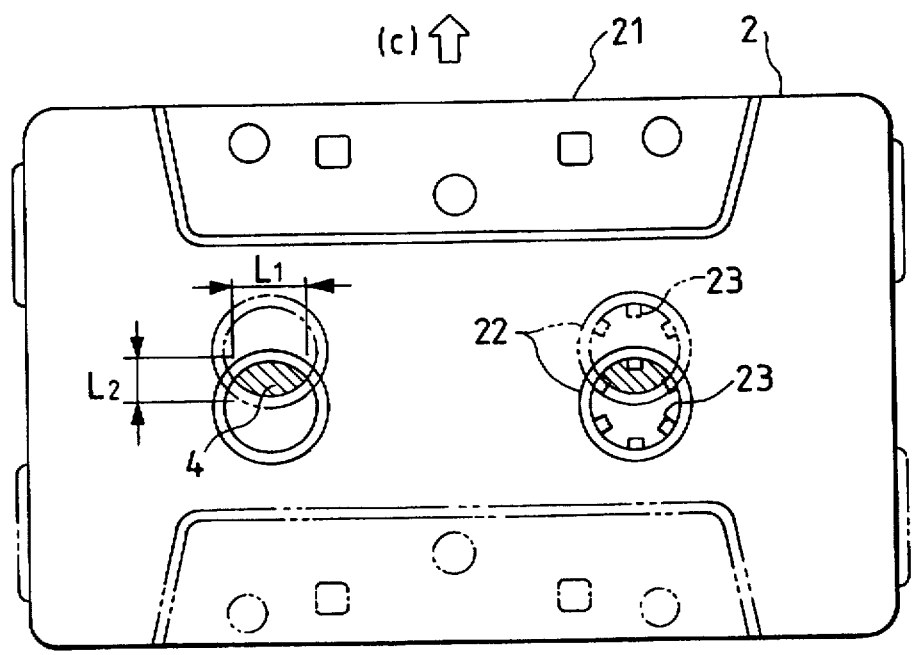
FIG. 21 shows a position of the hub in a tape cassette.

In the embodiment, the projections 67 are positioned on the casing wall 65 so that the projections 67 engage the hub 22 of the tape cassette 2 loaded into the cover section 61 even if the tape cassette 2 is loaded into the casing section 61 in either a positive direction or a reverse direction. More specifically, the projections 67 have a peak (that is, an end most remote from a surface of the casing wall in a direction vertical to the surface) positioned in a common area in which the hub is located when the tape cassette is loaded into the cover section 61 in a positive direction (herein, the positive direction is defined as the direction in which the front opening 21 is received in the pocket section 64 of the cover section 61) and also in which the hub is located when the tape cassette is loaded into the cover section 61 in a reverse direction. The common area corresponds to the hatched area 4 shown in FIG. 21 having the shape of a spindle (or an ellipse).

The hub 22 is stored in a cassette half of the tape cassette 2 so that the hub 22 is allowed to move in a diametric direction thereof in a predetermined range (that is, the hub 22 has a slight play while being received in the tape cassette 2). Accordingly, both a length $L_1$ of a major axis and a length $L_2$ of a minor axis of the common area 4 may be varied in accordance with the displacement of the hub within the cassette tape 2.

FIGS. 3(a) and 3(b) show the common area 4 varying in accordance with the displacement of the hub 22 within the cassette tape 2. FIG. 3(a) illustrates the common area 4 when the hub 22 is displaced to a maximum degree towards a rear end of the tape cassette 2. FIG. 3(b) illustrates the common area 4 when the hub 22 is not displaced (that is, the hub 22 is located substantially at the center), and FIG. 3(c) illustrates the common area 4 when the hub 22 is displaced to a maximum degree towards a front end of the tape cassette 2. Lengths $L_1$, $L_2$ and $L_3$ all indicate an interval between the hub pawls 23 projecting into the common area 4, which can be seen when the tape cassette is loaded into the cover section in a positive or reverse direction.

As illustrated in FIGS. 1 and 2, the projection 67 comprises two plate-like portions 71 and 72 spaced away from each other and positioned in the above-mentioned common area 4 in which the hub 22 is located when the hub 22 is loaded into the cover section in both a positive direction and a reverse direction, and a connection 73 for connecting the plate-like portions 71 and 72 at bottom ends thereof to each other. The plate-like portions 71 and 72 cooperate with each other to provide a space 75 therebetween into which one of the hub pawls 23 formed at an internal surface of the hub opening is to be engaged. As illustrated in FIGS. 4 to 6, the plate-like portions 71 and 72 are different in height, that is, the plate-like portion 71 is designed to be taller, while the plate-like portion 72 is designed to be lower.

As illustrated in FIG. 4, the connection 73 has a maximum height h which is the same as the height of the lower plate-like portion 72. The connection 73, as illustrated in FIG. 2, connects the taller plate-like portion 71 to the lower plate-like portion 72 at their intermediate portions in a widthwise direction thereof to thereby provide the spaces 75 at opposite sides of the connection 73 for engaging the hub pawl thereto. Into one of the spaces 75 is fit the hub pawl 23 when the tape cassette 2 is loaded, for instance, in a positive direction, while into the other of the spaces 75 is fit the hub pawl 23 when the tape cassette 2 is loaded in a reverse direction.

The width of the connection 73 may be appropriately varied. Thus, since the connection 73 is relatively thicker in width and hence has a greater strength within the storage case 6, it is possible to obtain an area 76 abutted by an ejector pin when the projection is to be extracted from a die after injection molding has been completed.

As illustrated in FIGS. 2 and 4, internal surfaces of the taller plate-like portion 71 and the lower plate-like portion 72 cooperating with each other to form the spaces 75 are designed to be inclined surfaces providing a narrower width of the space 75 at a height closer to a bottom end thereof. The width $W_3$ of the spaces 75 at their upper ends is determined to be an appropriate width greater than the outer diameter of a locus obtained when the hub pawl 23 is rotated so that the hub pawl 23 received in the space 75 does not interfere with the upper end of the lower plate-like portion 72 when the cover section 61 of the storage case 6 is closed, and is then smoothly introduced into the space 75. The width of the spaces 75 at their bottom ends is determined to be an appropriate value so that the hub pawl 23 received in the space 75 does not have a large play when the cover section 61 of the storage case 6 is closed.

As illustrated in FIG. 2, the lower plate-like portion 72 of the projection 67 has a side edge extending in a direction from a front end to a rear end, and vice versa, of the tape cassette 2 to be encased in the case (that is, in a direction along a line X in FIG. 2), while the taller plate-like portion 71 has a side edge extending at a predetermined angle relative to a direction from a front end to a rear end, and vice versa, of the tape cassette 2 (that is, a direction along a line Y in FIG. 2).

The storage case 6 in accordance with the invention allows the hub opening to be engaged to the projection 67 even though the tape cassette 2 is loaded in either a positive direction or a reverse direction by positioning the peak of the projection 67 within the above-mentioned common area 4. The storage case 6 is designed basically on the assumption that the tape cassette 2 is loaded in a reverse direction, and hence extension directions of the taller and lower plate-like portions 71 and 72 and so on are inverted.

In addition, the casing section 6 in accordance with the embodiment is designed to be more slim. Hence, as illustrated in FIG. 7, both the casing wall 65 of the cover section 61 and the cover wall 63 of the casing section 62 are formed with a recessed portion 81 at a location at which an increased thickness portion 25 of the cassette tape 2 is to be located. The recessed portion 81 receives therein the increased thickness of the portion 25.

The tape cassette is loaded into the storage case as follows.

After the tape cassette 2 has been loaded at its rear end into the pocket section of the cover section 61, the cover section 61 is closed relative to the casing section 62. If the plate-like portions 71 and 72 are to come at their ends into contact with the hub pawls 23a and 23b, respectively, as illustrated in FIG. 8, one of the plate-like portions (the taller plate-like portion 71 in FIG. 8) comes at its end into contact with a corner of the peak of the hub pawl 23a. In this situation, a component of a pushing force $F_1$ exerted on the hub pawl 23a by the plate-like portion 71 causes the hub 22 to rotate in the clockwise direction to thereby introduce the hub pawl 23a into the space 75 (see FIG. 2) formed between the plate-like portions 71 and 72. Thus, when the hub pawl comes into engagement with the projection 67 as illustrated in FIG. 2, the loading of the tape cassette into the storage case is completed.

FIG. 8 illustrates a case in which the hub 22 comes into engagement with the projection on the condition that the ridgeline of the edge of the taller plate-like portion 71 of the projection does not intersect a central axis of the hub pawl 23a (herein, a central axis of the hub pawl 23a is defined as a central axis of a circular cylinder such as one obtained by considering the hub pawl to be a circular cylinder extending towards the rotational axis of the hub) on such a central axis of the hub pawl 23a when viewed from the top. On the other hand, FIG. 9 illustrates a case in which the hub 22 comes into engagement with the projection on condition that the ridgeline of the edge of the taller plate-like portion 71 of the projection intersects the central axis of the hub pawl. In FIG. 9, the ridgeline q of the edge of the taller plate-like portion 71 intersects the central axis p of the hub pawl 23a on the central axis. In this case, the taller plate-like portion 71 exerts a force $F_1$ on the hub pawl 23a in a direction along the ridgeline q when the casing section is closed. Since the force $F_1$ makes an angle with the central axis p of the hub pawl 23a, a component $f_1$ of the force $F_1$ is exerted on the hub pawl 23a to thereby rotate the hub 22 in the counterclockwise direction. Such a rotation introduces the hub pawl 23b into the space formed between the plate-like portions 71 and 72, and thus the engagement of the hub 22 with the projection 67 is smoothly completed.

Figure 26:
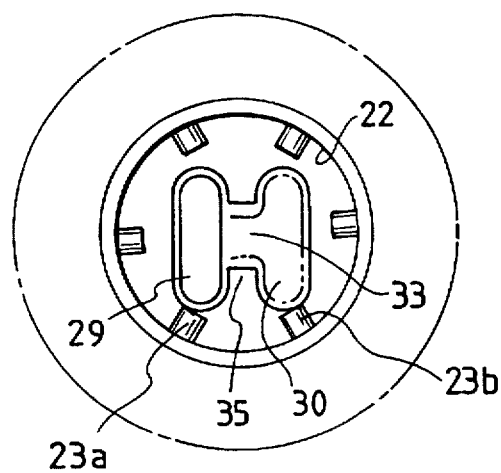
FIG. 26 shows problems of the projection illustrated in FIG. 23.

As is obvious from the above description, the projection of the storage case in accordance with the present invention prevents a situation from occurring in which the two plate-like portions simultaneously come into contact with peaks of the adjacent disposed hub pawls 23a and 23b as illustrated in FIG. 26, and ensures that one of the plate-like portions surely comes in contact with a peak of the hub pawl. Thus, there is no possibility of difficulty in opening the cover section and of damage to the hub pawls and the plate-like portions.

In addition, as is obvious from FIGS. 4 to 6, the taller plate-like portion 71 is designed to have a rounded peak in a widthwise direction thereof and further have a slope S smoothly, downwardly inclining from the peak to the side edge thereof with which the hub pawl 23 contacts in order to rapidly introduce the hub pawl 23, which first comes into contact with the peak of the taller plate-like portion 71 when the cover section 61 is closed, into the space 75.

Figure 22:
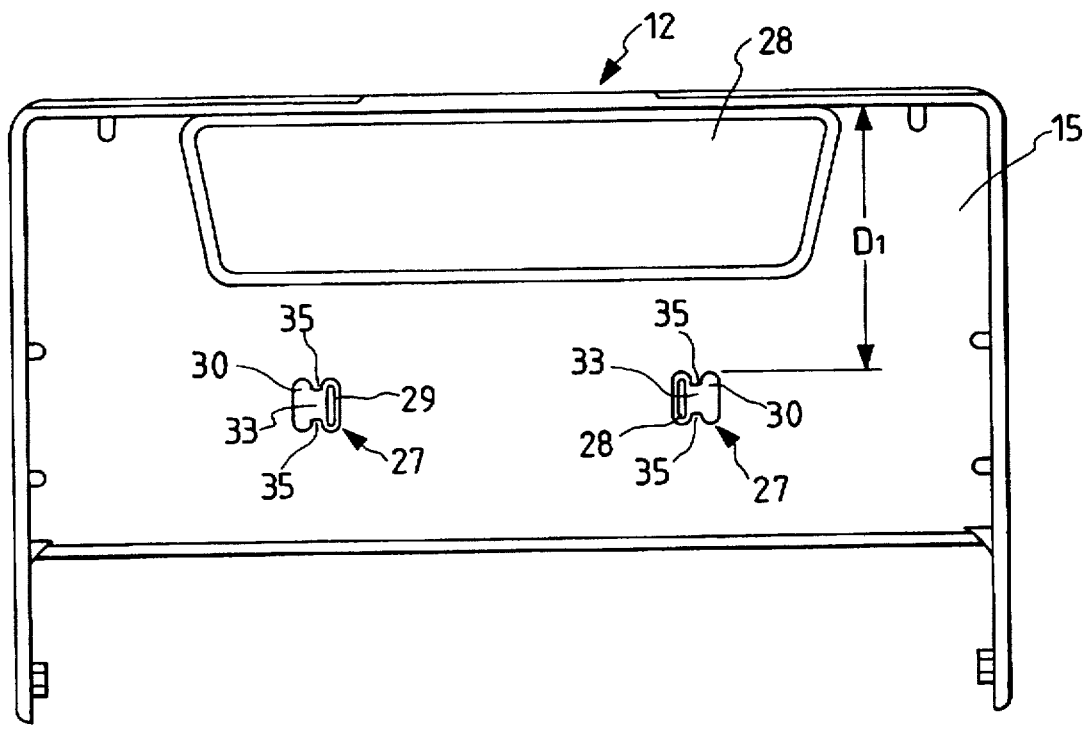
FIG. 22 is a plan view illustrating another conventional projection.
Figure 23:
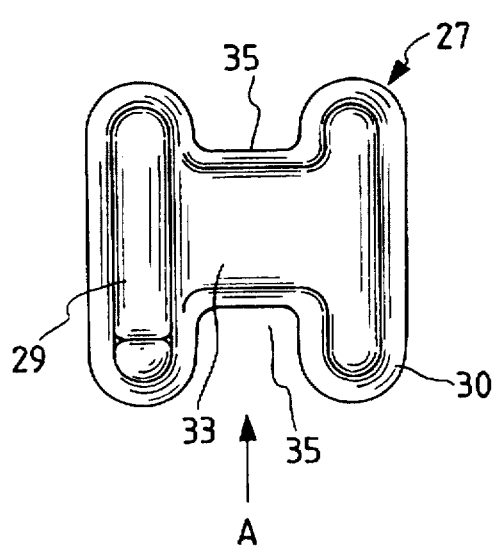
FIG. 23 is an enlarged plan view illustrating the projection illustrated in FIG. 22.
Figure 24:
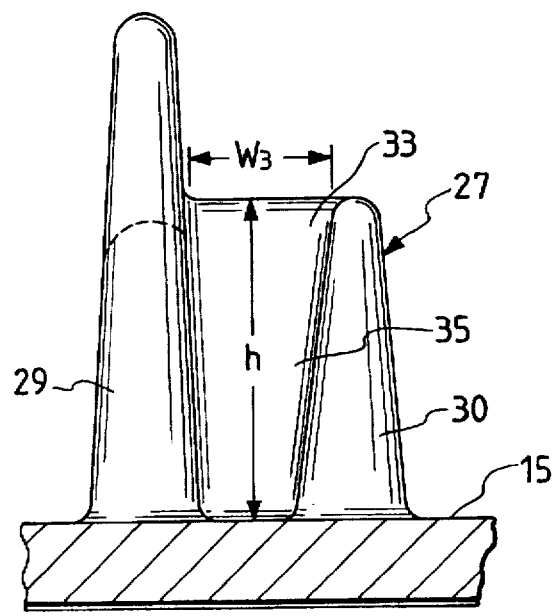
FIG. 24 is a side view of the projection as viewed in the direction of an arrow A in FIG. 23.
Figure 25:
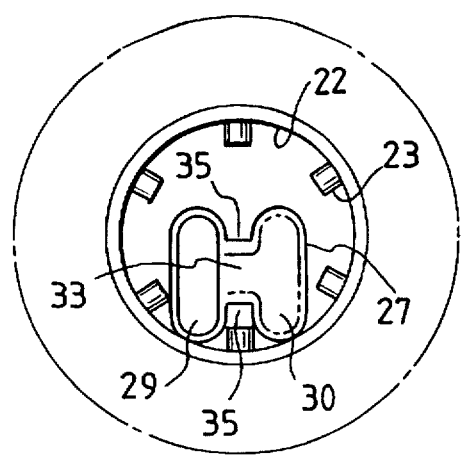
FIG. 25 is an enlarged view illustrating engagement of the projection illustrated in FIG. 23 with the hub.

As illustrated in FIG. 22, both of the plate-like portions 29 and 30 of the conventional projections 27 are equally spaced away from an internal surface of a side wall of the casing section 12 by a distance $D_1$.

On the other hand, as illustrated in FIG. 1, in this embodiment, the lower plate-like portion 72 is spaced from an internal surface of a side wall of the casing section 62 by a distance $D_2$, while the taller plate-like portion 71 is spaced from an internal surface of a side wall of the casing section 62 by a distance $D_3$. The distances $D_1$, $D_2$ and $D_3$ are determined according to $D_1 > D_2 > D_3$.

Such a determination of the distances allows the projection 67 to readily enter the hub even if the length $L_2$ of the common area 4 in a minor axis direction is shortened due to play of the hub 22 within the tape cassette 2.

In the storage case 6 structured as mentioned above, even if the hub pawls 23 of the hub 22 come into contact with the side edges of the plate-like portions 71 and 72 in an initial stage of closing the cover section 61 relative to the casing section 62, as illustrated in FIGS. 8 and 9, the inclined surface of the side edge of the taller plate-like portion 71 exerts a force on the hub pawl 23 to thereby rotate the hub in either the clockwise or counterclockwise direction, and thus the hub pawl 23 can come into engagement with the space 75 formed between the plate-like portions 71 and 72.

In addition, since the plate-like portions 71 and 72 are enforced by the connection 73, it is possible to prevent lack of strength of the plate-like portions 71 and 72 even if they are formed to be thin in order to readily enter a space between the adjacent hub pawls 23 of the hub 22.

Thus, it is possible to precisely position and fix the hub 22 by means of the projections 67, readily obtain a strength required for the projections 67, prevent the occurrence of biting of the projection 67 with the hub pawls 23, and enhance the convenience with which the case is to be used.

In addition, mentioned earlier, by positioning the projections 67 in the common area 4 in which the hub 22 is located when the tape cassette 2 is loaded in either a positive direction and a reverse direction, it is possible to load the tape cassette in both positive and reverse directions, further enhancing convenience with which the storage case can be used.

In the first embodiment having been described so far, the increased thickness portion 25 of the cassette tape 2 is received into the recesses 81 formed at the cover section 61 and the casing section 62 to thereby make the whole of the storage case 6 slim, with the result of decreasing the amount of space required for storing the case and enhancing the portability of the storage case. Moreover, the magnetic tape cassette 2 can be loaded from either the front end or rear end thereof into the pocket section 64 (the rotational axis of the pivots of the storage case extends in a direction from the left to the right, and vice versa, of the cassette tape).

It should be noted that the invention can be applied to a storage case in which the rotational axis of pivots of a storage case extends in a direction from the left to the right, and vice versa, of a cassette tape (that is, a storage case in which left or right side end of a cassette case is loaded into a pocket section). It also should be noted that the invention can be applied to a storage case which is not designed to be slim, unlike the above-mentioned embodiment.

Figure 11:
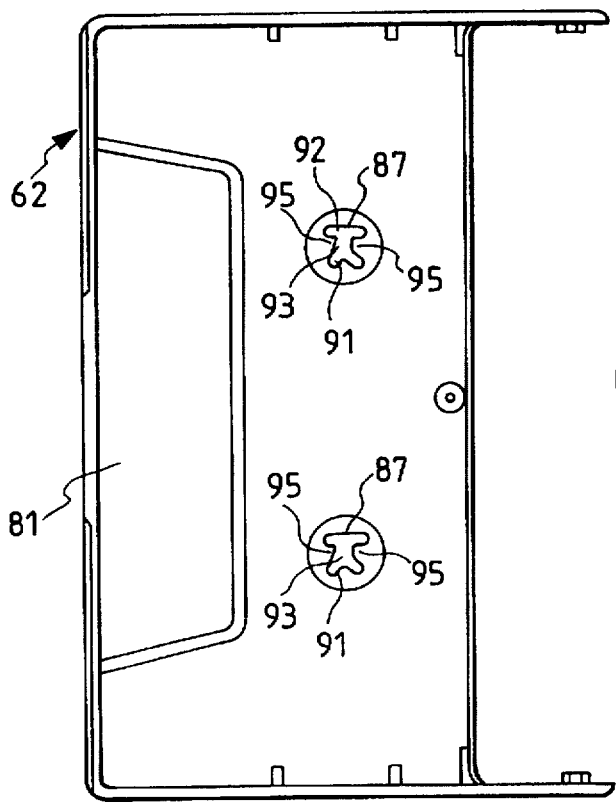
FIG. 11 is a top plan view of the casing section of the storage case in accordance with a second embodiment of the invention.
Figure 12:
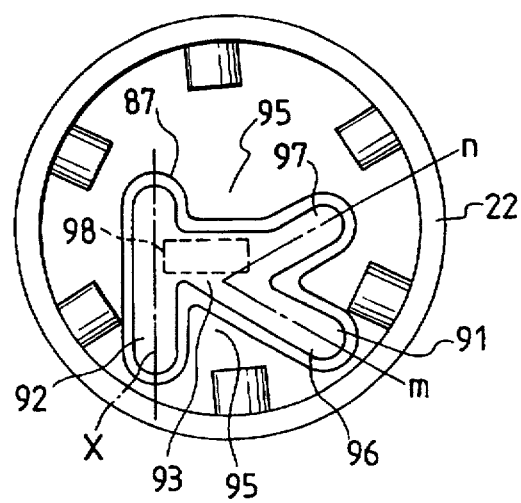
FIG. 12 is a plan view illustrating engagement of the projection with the hub of the tape cassette in the second embodiment.
Figure 13:
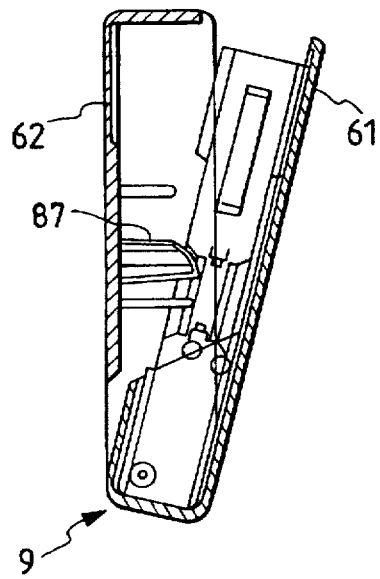
FIG. 13 illustrates a condition in which the cover section is about to start closing relative to the casing section with the tape cassette being loaded in a reverse direction in the storage case in accordance with the second embodiment.
Figure 14:
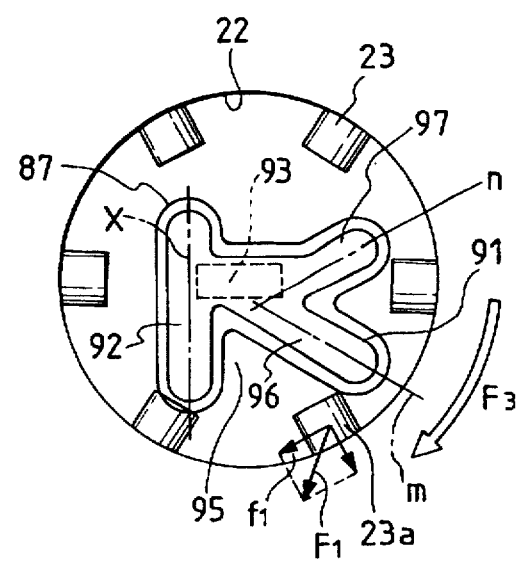
FIG. 14 shows a function of the projection in accordance with the second embodiment.
Figure 19:
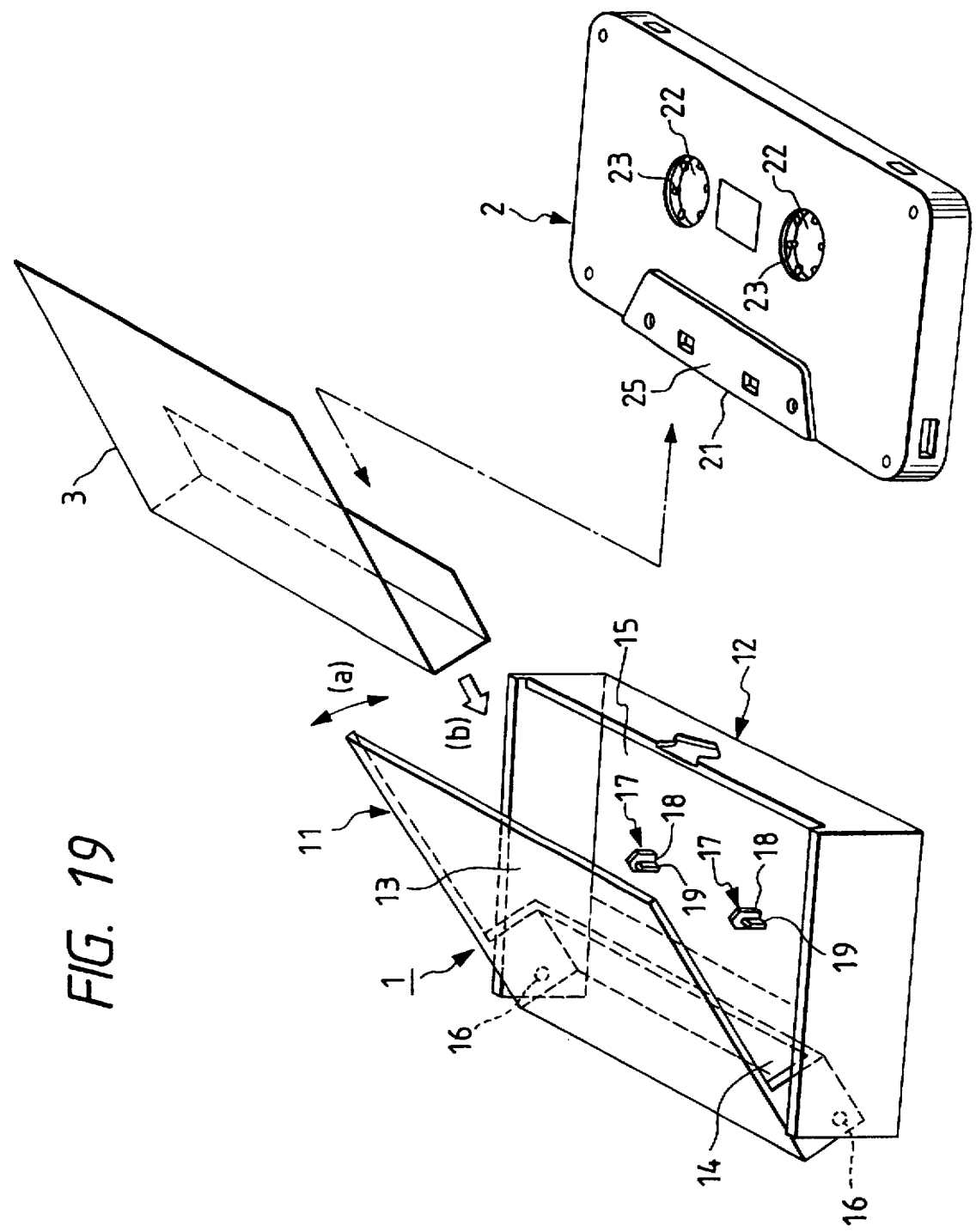
FIG. 19 is a perspective view of a conventional storage case.
Figure 20:
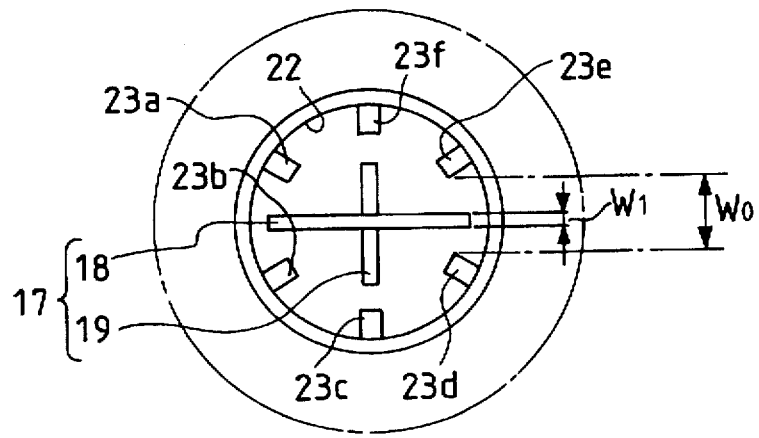
FIG. 20 illustrates problems of the conventional storage case.

FIGS. 11 to 18 illustrate a storage case in accordance with a second embodiment of the present invention. This embodiment is in particularly preferable when a tape cassette is designed so that the tape cassette may be loaded either in a positive direction or a reverse direction. FIG. 11 is a top plan view of the casing section 62, FIG. 12 is a plan view showing engagement of a projection formed on the casing section 62 with the hub 22 of a tape cassette, FIG. 13 illustrates a condition in which the cover section 61 is about to start closing relative to the casing section 62 in a storage case 9 when the tape cassette is loaded in a reverse direction, FIG. 14 illustrates the function of the projection 8 when the tape cassette is loaded in the reverse direction, FIG. 15 is a side view illustrating a condition in which the cover section 61 has been closed relative to the casing section 62 in the storage case 9 when the tape cassette is loaded in the reverse direction, FIG. 16 is a plan view illustrating a condition in which the cover section 61 has been closed relative to the casing section 62 in the storage case 9 when the tape cassette is loaded in the reverse direction, FIG. 17 is a side view illustrating a condition in which the cover section 61 has been closed relative to the casing section 62 in the storage case 9 when the tape cassette is loaded in the positive direction, and FIG. 18 is a plan view illustrating a condition in which the cover section 61 has been closed relative to the casing section 62 in the storage case 9 when the tape cassette is loaded in the positive direction.

The storage case 9 in accordance with the second embodiment has the same structure as that of the storage case in accordance with the first embodiment, except for the projections 87, and hence parts which correspond to those of the first embodiment have been identified with the same reference numerals and will not be explained in further detail.

Hereinbelow will be explained the structure of the projections 87.

As illustrated in FIGS. 11 and 12, the projection 87 include two plate-like portions 91 and 92 spaced away from each other, peaks of the plate-like portions 91 and 92 being positioned in the above-mentioned common area 4 in which the hub 22 is located when the hub 22 is loaded into the cover section in either a positive direction or a reverse direction, and a connection 93 for connecting the plate-like portions 91 and 92 at bottom ends thereof to each other. The plate-like portions 91 and 92 cooperate with each other to provide a space 95 therebetween into which one of the hub pawls 23, formed on an internal surface of the hub 22, is to be engaged. The connection 93 not only reinforces the plate-like portions 91 and 92, but also provides an area 98 to be abutted by an ejector pin when the projection 87 is to be extracted from a die after injection molding has been completed.

The projection 87 in the second embodiment surely prevents the biting of the plate-like portions 91 and 92 with the hub pawls 23 of the hub 22 on closing the cover section 61 when the cassette tape 2 is loaded either in a positive direction or a reverse direction. As illustrated in FIG. 12, one (91) of the plate-like portions extends in a direction from the front to the rear, and vice versa, of the tape cassette to be encased in the storage case (that is, in the direction along a line X in FIG. 12), while the other plate-like portion 91 is composed of two plate-like sections 96 and 97 and is shaped substantially in the form of a letter V as viewed from the top.

The plate-like section 96 provides the space 95 which the hub pawl 23 of the hub 22 engages when the tape cassette 2 is loaded in a reverse direction, while the plate-like section 97 provides the space 95 which the hub pawl 23 of the hub 22 engages when the tape cassette 2 is loaded in a positive direction. In FIG. 12, a line m indicates the direction in which the plate-like section 96 extends, and a line n indicates the direction in which the plate-like section 97 extends. As is obvious from the comparison of the lines m and n with the above-mentioned line X, each of the plate-like sections 96 and 97 make a predetermined angle with respect to a direction from the front to the rear, and vice versa, of the tape cassette 2.

By setting the directions in which the plate-like portions 91 and 92 extend as aforementioned, it is possible to release engagement of the hub pawl 23 with the edges of the plate-like portions 91 and 92, even if the tape cassette 2 is loaded either in a positive direction or a reverse direction. That is, when the ends of the plate-like portions 91 and 92 are to come into contact with the hub pawls 23 when the cover section 61 are closed relative to the casing section 62, one of the ends of the plate-like portions first comes into contact with a corner of the peak of the hub pawl 23, as viewed from the top. In this situation, a pushing force exerted on the hub pawl 23 by the plate-like portion 91 or 92 causes the hub 22 to rotate to thereby release engagement of the hub pawl 23 with the plate-like portions 91 and 92 at the edges thereof.

If the tape cassette 2 has been loaded in a reverse direction and then the cover section 61 has been closed as illustrated in FIG. 13, the hub pawls 23 come into contact with the plate-like section 96 and the plate-like portion 92 at their tip ends, as illustrated in FIG. 14. In the illustrated embodiment, a corner of the peak of the hub pawl 2 comes into contact with the plate-like section 96, as viewed from the top.

The plate-like section 96 exerts the above-mentioned pushing force $F_1$ on the hub pawl 23 in a direction along a normal line extending from a point at which the plate-like section 96 comes into contact with the hub pawl. As having been explained with regard to the first embodiment, the sum of components $f_1$ of the pushing force $F_1$ in the direction of rotation of the hub 22 results in a force $F_3$, which rotates the hub 22. As a result, the hub pawl 23 is introduced into the space 95 formed between the plate-like section 96 and the plate-like portion 92, thereby providing proper engagement of the hub pawl to the projection.

FIGS. 15 and 16 illustrate a condition in which the hub 22 of the tape cassette 2 loaded in a reverse direction is positioned and fixed in place by means of the projection 87 after the cover section 61 had been closed.

On the other hand, if the cover section 61 is closed with the tape cassette 2 being loaded in a positive direction as illustrated in FIG. 17, the hub pawl 23 is introduced into the space 95 formed between the plate-like section 97 and the plate-like portion 92 to thereby position and fix the hub 22. Though it is considered that the hub pawl 23 may simultaneously come into contact with both the plate-like section 97 and the plate-like portion 92 with the tape cassette 2 loaded in a positive direction when the cover section 61 has been closed, a pushing force exerted on the hub pawl 23 by the plate-like section 97 or the plate-like portion 92 causes the hub 22 to rotate, thereby releasing engagement of the hub pawl 23 with the plate-like section 97 and the plate-like portion 92 at their ends. Thus, the hub pawl 23 properly comes into engagement with the space 95 formed between the plate-like section 97 and the plate-like portion 92.

FIG. 18 illustrates a condition in which the hub 22 of the tape cassette 2 loaded in a positive direction is positioned and fixed in place by means of the projection 87 after the cover section 61 had been closed.

As having been described so far, the storage case 9 in accordance with the second embodiment prevents biting of the hub pawl 23 of the hub 22 with the projection 87 on closing the cover section 61 when the tape cassette 2 is loaded either in a positive direction or a reverse direction. As a result, the hub 22 is quickly and precisely positioned and fixed in place.

In addition, since the plate-like portions 91 and 92 cooperating with each other to constitute the projection 87 are enforced by the connection 93, the plate-like portions 91 and 92 will have sufficient strength, even if they are thin, to readily enter the space between the adjacent disposed hub pawls 23 of the hub 22.

As having been described, the case for encasing a cassette therein in accordance with the invention ensures engagement of the hub pawl in the space formed between the two plate-like portions of the projection. That is, even if the hub pawl of the hub comes into contact with the plate-like portions at their edges when the cover section is closed relative to the casing section, one of the plate-like portions of the projection comes at its edges into contact with a corner of a peak of the hub pawl. The sum of pushing forces exerted on the hub pawl by the plate-like portions causes the hub to rotate. Thus, the hub pawl smoothly comes out of engagement with the plate-like portion, resulting in the hub pawl coming into engagement with the space formed between the plate-like portions of the projection.

In addition, since the plate-like portions of the projection is enforced by the connection, the plate-like portions will have sufficient strength, even if they are thin, for readily enter the space between the adjacent disposed hub pawls of the hub.

Thus, it is possible to precisely position and fix the hub by means of the projections, readily obtain a strength required for the projections, prevent the occurrence of biting of the projection with the hub pawls, and enhance the convenience with which the case is used.

In addition, by positioning the projections in the common area in which the hub is located when the tape cassette is loaded in either a positive direction or a reverse direction, it is possible to load the tape cassette in either a positive or reverse directions, and to enhance the convenience with which the storage case is used without occurrence of biting in either positive or reverse direction loading of the tape cassette.

What is claimed is:

1. A case for encasing a cassette therein, said case comprising: a cover section comprising a cover wall facing one side of a magnetic tape cassette housed in said case and a pocket section formed at one end of said cover wall for receiving one end of said magnetic tape cassette, and a casing section comprising a projection formed on a casing wall facing said cover wall, said projection being positioned to enter a hub of said magnetic tape cassette to thereby engage to a hub pawl for preventing said hub from rotating, said casing section being pivotably secured to said cover section so that said casing section is capable of opening and closing relative to said casing section, said projection comprising two plate-like portions cooperating to provide a space into which said hub pawl is received when said projection enters said hub, at least one of said plate-like portions being formed with an inclined portion which directs a force in a direction to cause said hub to rotate, said force being exerted on said hub pawl by said one of said plate-like portions when said one of said plate-like portions comes into contact with said hub pawl when closing said cover section to said casing section wherein said one of said plate-like portions extends in a direction in which said magnetic cassette tape is received into said pocket section, and the other of said plate-like portions has an edge portion extending at an angle to said first direction and further having an inclination relative to a surface of said casing wall.

2. The case as recited in claim 1, wherein said two plate-like portions have an end located most remote from said surface of said casing wall in a vertical direction, said end being located in an area in which an opening of said hub is commonly located when said magnetic tape cassette is loaded both in positive and negative directions onto said casing section, said one of said plate-like portions which comes into contact with said hub pawl when said magnetic tape cassette is loaded both in a positive direction and in a negative direction having an edge formed with an inclined portion which directs a force in a direction to cause said hub to rotate, said force being exerted on said hub pawl by said one of said plate-like portions when said one of said plate-like portions comes into contact with said hub pawl when closing said cover section to said casing section, whereby, when said hub pawl comes into contact with each of said edges of said two plate-like portions when closing said cover section relative to said casing section with said magnetic tape cassette loaded in a positive or negative direction, each of said plate-like portions exerts a pushing force on said hub pawl to rotate said hub to cause said hub pawl to be released from engagement with said edge of said plate-like portion.

3. The case as recited in claim 1, wherein said projection further comprises a connection for connecting said plate-like portions at bottom ends thereof to each other.

4. The case as recited in claim 3, wherein said one of said plate-like portion is designed taller than the other of said plate-like portions.

5. The case as recited in claim 4, wherein said connection connects said one of said plate-like portions to said other of said plate-like portions at their intermediate portions in a widthwise direction thereof to thereby provide spaces at opposite sides of said connection for receiving said hub pawl therein.

6. The case as recited in claim 5, wherein internal surfaces of said one of said plate-like portions and said other of said plate-like portions cooperating with each other to form the spaces are inclined surfaces providing a narrower width of the space at a height closer to a bottom end thereof, and the width of the spaces at their upper ends is determined to be an appropriate width greater than the outer diameter of a locus obtained when said hub pawl is rotated.

7. The case as recited in claim 4, wherein said other of said plate-like portions has a side edge extending in a direction from a front end to a rear end of said tape cassette to be encased in said case, while said one of said plate-like portions has a side edge extending at a predetermined angle relative to a direction from a front end to a rear end of said tape cassette.

8. The case as recited in claim 4, wherein said one of said plate-like portions has a rounded peak in a widthwise direction thereof and a slope smoothly, downwardly inclining from the peak to the side edge thereof.

9. The case as recited in claim 4, wherein said other of said plate-like portions is spaced from an internal surface of a side wall of said casing section by a distance $D_2$, while said one of said plate-like portions is spaced from an internal surface of a side wall of said casing section by a distance $D_3$, and the distances $D_1$, $D_2$ and $D_3$ are determined according to $D_1 > D_2 > D_3$, where the distance $D_1$ represents a distance by which both of the plate-like portions of the conventional projections are equally spaced away from an internal surface of the side wall of said casing section.

10. The case as recited in claim 3, wherein said connection has a maximum height h which is the same as the height of said others of said plate-like portions.

11. The case as recited in claim 1, wherein said casing section is designed to be more slim, and both the casing wall of said cover section and said cover wall of said casing section are formed with a recessed portion at a location at which an increased thickness portion of said cassette tape is to be located, said recessed portion receiving therein the increased thickness of said increased thickness portion of said cassette tape.

12. The case as recited in claim 1, wherein said other of said plate-like portions extends in a direction from the front to the rear of said tape cassette to be encased in the storage case, while said one of said plate-like portions is composed of two plate-like sections and is shaped substantially in the form of a letter V as viewed from the top.

* * * * *